UNITED STATES PATENT OFFICE.

WILLIAM ADAMSON, OF PHILADELPHIA, PENNSYLVANIA.

IMPROVEMENT IN METHODS OF TREATING BONES FOR GLUE-STOCK.

Specification forming part of Letters Patent No. 216,816, dated June 24, 1879; application filed December 2, 1878.

*To all whom it may concern:*

Be it known that I, WILLIAM ADAMSON, of Philadelphia, Pennsylvania, have invented a new and useful Improvement in the Preparation of Bones for Glue-Stock, of which the following is a specification.

My invention relates to the preparation of bone glue-stock; and consists in treating bones first with hydrocarbons and then with acids, so that they shall more readily yield their gelatine than by the old process, and that there may be economy in the consumption of acid, an abridgement of the process of extracting the gelatine, and a superior product.

The ordinary plan of preparing bones for glue-stock prior to my invention has been to first boil the bones in water, with a view of extracting as much of the fatty matter as possible, and, after drying the boiled bones, to treat them with muriatic, phosphoric, or other acid, for dissolving out the earthy matter, after which they were ready for reduction to glue or gelatine by the usual process of digesting.

One of the difficulties attending this old process is the impossibility of extracting all the fatty matter from the bones by the ordinary boiling operation, from six to ten per cent. of fatty matter usually remaining. The presence of this fat or grease not only interferes with the effective action of the acid, but has a tendency to impair the gelatine extracted from the bones after the acid treatment.

Another difficulty attending the old plan was the extraction of a portion of the gelatine, due to boiling and the contraction of the bones, thereby closing the pores and preventing the easy access of the acid.

I overcome these difficulties in the following manner: I discard the old process of boiling the bones preparatory to treatment by acid, and subject them to the action of hydrocarbons, either in the condition of liquid or vapor, preferring, however, the plan described in the reissued Letters Patent No. 5,610, October 21, 1873, (original Patent No. 119,000, September 19, 1871,) in which fatty and oily matter was extracted from animal offal by subjecting the same to the action of hydrocarbon vapors in a closed vessel.

Two important results are attained by subjecting the bones to this treatment—first, all the fatty matter is extracted, and, second, there is no shrinkage of the bones, which are consequently in the best condition for readily yielding to the action of the acid; hence, one-half the acid required in treating boiled bones is sufficient for their treatment after they have been subjected to the action of the hydrocarbons.

The earthy matter, moreover, is more rapidly and effectually extracted from the bones treated as above, and the consequence of this is a larger yield and a better product, for there is no fat or grease to interfere with the extraction of the earthy matter, and the pores of the bones being open, access of the acid to them is unimpeded.

I prefer to conduct the acid treatment of the bones in the manner described in the Letters Patent (No. 188,088) granted to me March 6, 1877.

I wish it to be understood that I do not desire to claim either branch of the within-described process, separately considered; but

I claim as my invention—

The mode herein described of treating bones for glue-stock—that is to say, first subjecting them to the action of hydrocarbons, and, second, to the usual acid treatment, as set forth.

In testimony whereof I have signed my name to this specification in the presence of two subscribing witnesses.

WM. ADAMSON.

Witnesses:
ALEX. PATTERSON,
HARRY SMITH.